United States Patent

[11] 3,622,968

[72] Inventor Daniel Silverman
Tulsa, Okla.
[21] Appl. No. 824,925
[22] Filed May 15, 1969
[45] Patented Nov. 23, 1971
[73] Assignee Amoco Production Company
Tulsa, Okla.
Continuation-in-part of application Ser. No. 735,294, June 17, 1968, and a continuation-in-part of Ser. No. 512,689, Dec. 9, 1965

[54] ELASTIC-WAVE HOLOGRAPHY USING REFLECTIONS
4 Claims, 6 Drawing Figs.
[52] U.S. Cl. .................................................. 340/15.5
[51] Int. Cl. .................................................. G01v 1/28, G01v 1/34
[50] Field of Search .................................................. 340/3, 5, 15.5; 181/.5; 350/3.5

[56] References Cited
UNITED STATES PATENTS
3,400,363 9/1968 Silverman .................... 340/3
3,410,363 11/1968 Schwartz ..................... 350/3.5
3,467,216 9/1969 Massey ......................... 350/3.5
3,493,073 2/1970 Wolfe et al. ................. 350/3.5
3,503,037 3/1970 Smith, Jr. ..................... 350/3.5

Primary Examiner—Rodney D. Bennett, Jr.
Assistant Examiner—N. Moskowitz
Attorneys—Paul F. Hawley and Newell Pottorf ABSTRACT: The shape of a reflecting surface within an elastic-wave transmitting medium is determined by an adaptation of holography, by propagating through the medium from a source or source pattern coherent elastic waves that are scattered and reflected by the surface to an areal detector array, the outputs of which combined with a reference wave are recorded as an optical hologram. Reconstructions from the hologram show not only the reflecting surface but a virtual source or source pattern image due to reflections of the real source or pattern by the surface. Virtual source directions or pattern distortions are interpreted in terms of the shape or curvature of the reflecting surface.

INVENTOR.
DANIEL SILVERMAN

INVENTOR.
DANIEL SILVERMAN
BY Newell Pottorf
ATTORNEY

INVENTOR.
DANIEL SILVERMAN
BY
Newell Pottorf
ATTORNEY 3,622,968

ELASTIC-WAVE HOLOGRAPHY USING REFLECTIONS

CROSS-REFERENCES

This application is a continuation-in-part of my copending application Ser. No. 735,294, filed June 7, 1968, and of the application with which it was copending, Ser. No. 512,689 filed Dec. 9, 1965, now U.S. Pat. No. 3,400,363.

BACKGROUND OF THE INVENTION

1. Field of the Invention

This invention relates to the mapping of elastic-wave reflecting surfaces within an elastic medium, for example, below a water surface and/or within the earth. More particularly, it is directed to the mapping of elastic-wave reflecting interfaces between geologic formations in the earth or beneath a water surface, by an adaptation of holography, with seismic or elastic waves.

2. Description of the Prior Art

The seismic method of geophysical prospecting for oil and gas or other minerals makes use of elastic waves generated in the earth for mapping the interfaces between geologic formations in the earth. The slope of these interfaces at each point beneath the surface of the earth, or, more generally, their attitudes or curvatures control the paths of migration and the trapping of oil and gas. It is, therefore, important in the search for deposits of oil and gas to be able to map the shape and attitudes of these subsurface interfaces.

In the conventional seismic method, elastic waves are set up in the earth generally by a single point source or pattern of sources. The wave may be a very short impulsive burst of energy, or an oscillatory wave of finite duration and constant or varying frequency that can be time-compressed to the equivalent of a brief impulse. This elastic-wave energy travels downwardly until it strikes a reflecting interface, where it is partially reflected upwardly and finally reaches the surface, where it is detected by an array of elastic-wave detectors. The signals reaching the detectors are recorded on multiple traces as functions of time, each trace representing the signal at a different detector area. By searching adjacent traces for similar events, it is possible to determine which events are reflections and from their travel time to estimate the distance down to the reflecting interface.

In this method, the outputs of a number of detectors are usually combined to help identify a reflection, so that it is not possible to determine the direction of a ray path except by comparison of relative depths of a number of adjacent reflecting points, or, what amounts to about the same thing, the relative arrival times of a common event at different detector groups.

SUMMARY OF THE INVENTION

It is a primary object of the present invention to provide a novel and improved method of using coherent seismic waves with patterns of detectors to determine the shape or curvature of subsurface reflecting interfaces by a holographic technique having greater accuracy and resolving power than conventional seismic techniques for detecting reflecting surface shapes.

In this invention, a single point source or a pattern of such sources sets up in the earth coherent, continuous elastic waves which travel downwardly to a reflecting interface where part of the energy is reflected upwardly to the surface. There, a steady-state pattern of wave energy is detected at a two-dimensional array of detectors, by adding to the output of each of the detectors a reference signal representative of the input coherent waves. From the pattern of combined signals, a hologram is generated and recorded, which, when irradiated with coherent light, reconstructs an image both of the reflecting interface and of the source or source pattern as seen reflected therein. Observation of the reconstructed image from different positions over the aperture of the hologram shows the image in different positions or directions, depending upon the curvature of the reflecting surface and the consequent deflection of the reflection rays. By measuring the direction to the reconstructed image from each of a plurality of selected parts of the hologram, the attitude or shape of the reflecting interface at each point on the reflecting surface can be deduced.

Also, a pattern of point sources can be used and the image of the pattern, as viewed in the reconstruction of the hologram, compared to the known source pattern. Any distortion in the image pattern can be interpreted on the basis of curvature of the reflecting surface. Since the distortion of the image pattern may take the form of a change in size, in place of or in addition to a change in shape, it is desirable to know the distance to the image or to the reflecting surface, which can be done by the methods outlined in column 6 of my U.S. Pat. NO. 3,400,363, and involves the use of diffracted and scattered waves as well as waves reflected from the interface.

BRIEF DESCRIPTION OF THE DRAWINGS

The foregoing and other objects and details of the present invention will be better understood by reference to the following description of the invention, taken in conjunction with the attached drawings. In the drawings.

DESCRIPTION OF THE PREFERRED EMBODIMENTS

Figure 1:
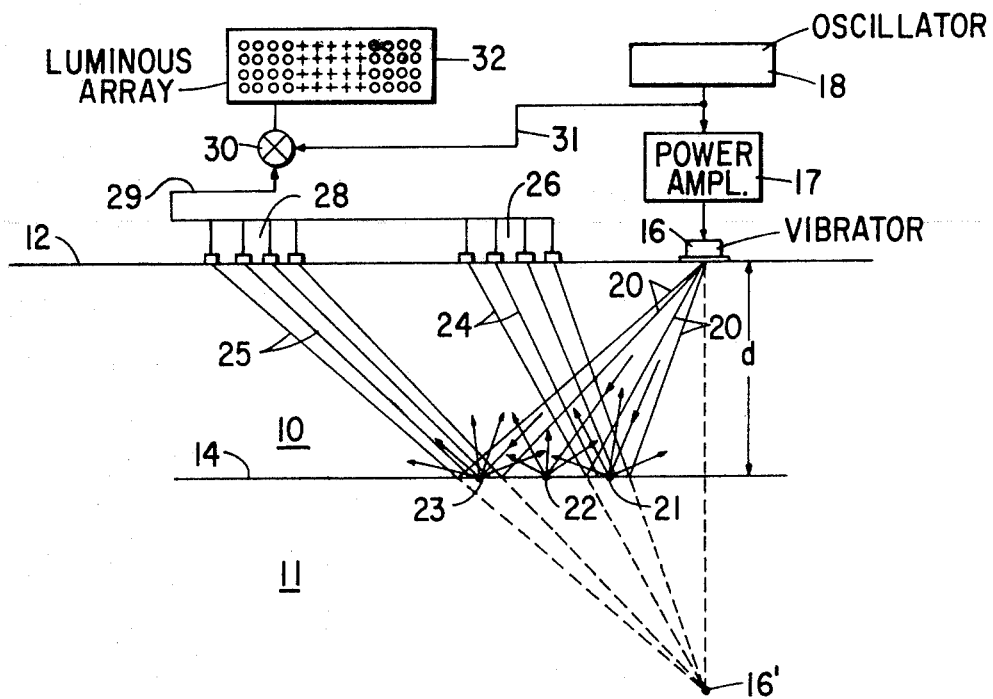
FIG. 1 is a schematic earth cross section showing an embodiment of the invention in position for making measurements thereon.

Referring now to the drawings, and in particular to FIG. 1 thereof, in this figure is shown diagrammatically in cross section two media, 10 and 11, capable of transmitting coherent elastic waves. Medium 10 might be, for example, a body of water with a free surface 12 overlying a solid medium 11 with the interface 14 between them. This choice of a liquid overlying a solid medium is only for simplicity and convenience in description, as the principles of the invention are applicable to any media capable of coherent elastic-wave transmission, whether gaseous, liquid, or solid, and whether different or similar, such as two solid media in contact at the interface 14.

As, in geophysical exploration for minerals such as oil and gas, or in other fields of endeavor utilizing elastic waves, it is important to know the precise shape or curvature of the interfaces between different media, FIG. 1 can be considered as a vertical section through the earth and the problem is to determine the shape or curvature of the interface 14.

As, in geophysical exploration for minerals such as oil and gas, or in other fields of endeavor utilizing elastic waves, it is important to know the precise shape or curvature of the interfaces between different media, FIG. 1 can be considered as a vertical section through the earth and the problem is to determine the shape or curvature of the interface 14.

By the principles of elastic-wave holography described in my copending application Ser. No. 735,294 and in the application with which it was copending, now issued as U.S. Pat. No. 3,400,363, an optical image of the interface 14 can be reconstructed for visual inspection in the following way. The interface 14 is such that elastic waves impinging upon it are diffracted or scattered back as well as transmitted. Thus, if a source 16 of continuous coherent elastic waves is placed in contact with medium 10 at its surface 12, and if the source 16 is driven by a constant frequency oscillator 18 through a power amplifier 17, coherent elastic waves are impressed on medium 10 and travel to interface 14.

Some of this wave energy traveling in the direction indicated by ray paths 20 impinges on interface 14, is scattered back therefrom at points such as 21, 22 and 23, and reaches arrays of elastic-wave detectors 26, 28 laid out in contact with surface 12 of medium 10. This scattering is both a diffuse reflection from all points of interface 14, as suggested by the arrows emanating in different directions from points 21, 22 and 23, as well as also being directly reflected energy coming from small areas centered at points 21 and 23 and traveling to detector arrays 26 and 28 by ray paths 24 and 25, respectively.

By whatever paths it arrives, the elastic-wave energy at detectors 26 and 28 is converted to corresponding electrical signals for transmission by a multiconductor cable 29 to an adder 30 where a reference electrical signal of the same frequency and of fixed amplitude and phase, conveyed by lead 31 from the output of oscillator 18, is added to the output of each detector unit in arrays 26, 28. The plurality of output signals from adder 30 are then impressed on a luminous means 32 such that a two-dimensional luminous pattern is formed, the intensity of which is related at each point to the combined signal plus reference of the corresponding point in the receiving array 26, 28. As is suggested by luminous array 32, detectors 26 and 28 are normally two-dimensional or areal arrays of receiving points spread over an area of the surface 12 or scanned across it in such a way as to reveal, in combination with the reference signal on lead 31 the standing-wave interference pattern of coherent energy received from interface 14. As is explained in my copending application and patent, upon photographing the luminous pattern of means 32 to the proper reduced scale, and photographically processing the exposed film, the result is a hologram of the interface 14. Then, as is well known, by irradiating this hologram with coherent light, an image of the interface 14 will be reconstructed.

The theoretical basis for the conventional process of forming a hologram and reconstructing an image relies primarily on the diffraction and scattering of the illuminating radiation by the surface of an object. Scattering in the sense here intended is a form of diffuse reflection in which each point of the object surface acts as a point source of illumination, with an expanding spherical wave front progressing therefrom toward the detecting array. In the reconstruction phase of the process, each of these object point sources is imaged as a point of illumination, all of which latter points together from an image of the object surface.

In the present invention, use is made of an additional phenomenon of the reflection of wave energy from the surface of an object, in which use the term "reflection" is employed in the sense of specular reflection as opposed to diffuse reflection or scattering. Consider, for example, a perfectly reflecting plane mirror illuminated with a point source of light. Although the mirror itself would not be visible in the illumination, the source could be seen reflected in the mirror surface. Reflection in this sense is illustrated in FIG. 1 where the energy beams designated by rays 20, impinging on interface 14 at the respective small areas surrounding points 21 and 23, travel thence by paths 24 and 25, respectively, to detectors 26 and 28. That is, the energy received on paths 24 and 25 appears to come from a virtual image 16' so that, upon reconstruction using the parts of the hologram corresponding to detector positions 26 and 28, the source will appear to be located at image 16' and not at interface 14. To the extent that interface 14 also scatters the radiation 20 impinging upon it, upon reconstruction there is formed an image of both interface 14 and of virtual source 16' seen through the partially transparent interface.

Figure 2:
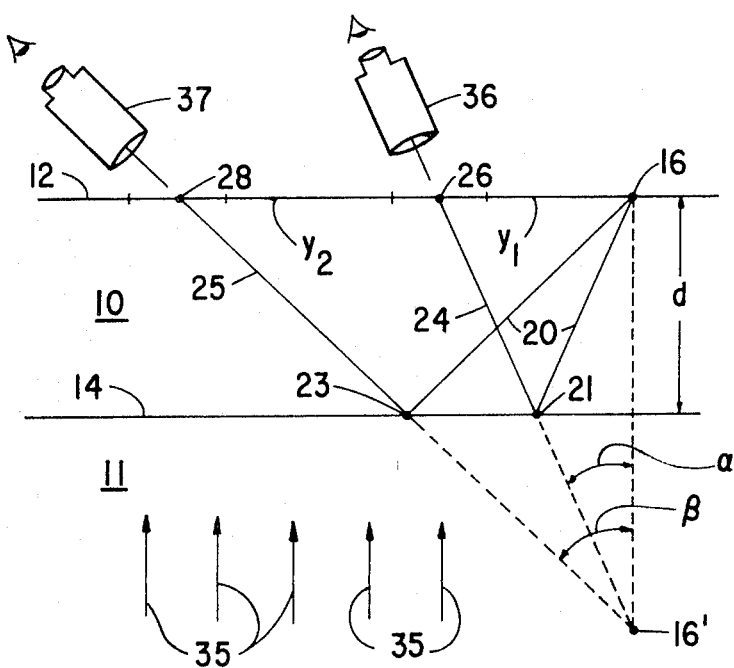
FIG. 2 is a simplified adaptation of FIG. 1 showing principally the geometrical relationships involved in that embodiment of the invention.

Referring now to FIG. 2, this figure is a simplified geometrical counterpart of FIG. 1 showing only the most important ray paths as regards the present invention. Here, the two rays 20 proceeding downwardly from source 16 and impinging on interface 14 at the reflection points 21 and 23 give rise to the reflected rays 24 and 25, respectively, reaching the surface at points 26 and 28. In this case, surface 12 and interface 14 are considered to be parallel planes spaced apart a distance $d$. Taking the diagram to represent a cross section as in FIG. 1, the plane 14 is shown as the straight line 14, and by conventional ray diagrams the ray paths 24 and 25 are represented as originating at virtual source point 16'.

FIG. 2, however, can be considered not only as a scaled geometrical diagram of the physical system in the earth, but it may be also considered to represent the optical system in reconstruction, where 12 is the hologram illuminated by laser light as suggested by the parallel arrows 35, and 16' is the reconstructed image of the source 16. That is, the ray path 24 represents the line of sight to reconstructed source image 16' as seen looking through the portion of the hologram having its center at point 26, while ray 25 is the line of sight to source image 16' seen by viewing the hologram area centered at point 28. In viewing the reconstruction, visual telescopes 36 and 37 can be used to establish quite accurately the directions of ray paths 24 and 25 as the respective lines of sight to virtual image 16'. Taking $\alpha$ and $\beta$ as the angles which lines 24 and 25 make with respect to the vertical between points 16' and 16, and letting $y_1$ and $y_2$ represent the distances of points 26 and 28, respectively, from point 16, then we can write that $$\tan \alpha = y_1/2d$$

or $$2d = y_1/\tan \alpha$$

Similarly, $$2d = y_2/\tan \beta$$

and therefore, eliminating $2d$, $$y_1/\tan \alpha = y_2/\tan \beta$$

Thus, if this expression is a true equation, this constitutes proof that the image seen from points 26 and 28 at image point 16' is a single image, and the interface 14 is a plane.

Figure 3:
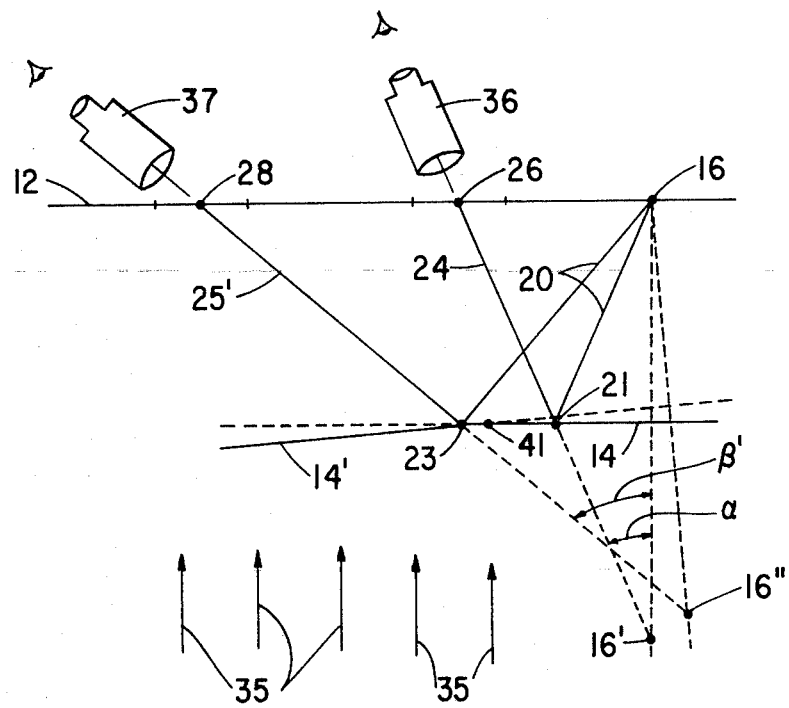
FIG. 3 corresponds to FIG. 2 except for showing the effect of a change in interface shape.

Turning now to FIG. 3, this figure is similar to FIG. 2 except that reflecting interface 14 has been bent into two linear parts 14 and 14' with a bending point or hinge at point 41. When hologram 12 is viewed by telescope 36 through the portion of the hologram surrounding point 26, the line of sight 24 shows the image of the source at point 16', the same as in FIG. 2. Sighting through telescope 37 and through the hologram surrounding point 28, however, establishes a new line of sight 25' to a new virtual image position at 16''. With respect to the vertical line connecting points 16 and 16', this direction 25' defines a new angle $\beta'$ differing from the angle $\beta$ of FIG. 2 by approximately the angle of deviation of plane 14' from plane 14. Thus, small changes in the shape or curvature of the interface 14, which would be difficult to detect and evaluate by the usual reconstruction practice of viewing the plane directly, become clearly recognizable and can be evaluated quantitatively by angular measurement of the lines of sight to be different virtual images 16', 16'' of the source point 16 apparent in different parts of the hologram.

Although this figure shows only one displacement of the virtual image 16' to position 16'', it will be apparent that by positioning an observing telescope such as 36 at many points within the two-dimensional area of hologram 12, and determining an image position and angle for each observation position, quite complex curvatures of the reflecting interface 14 may be determined.

Figure 4:
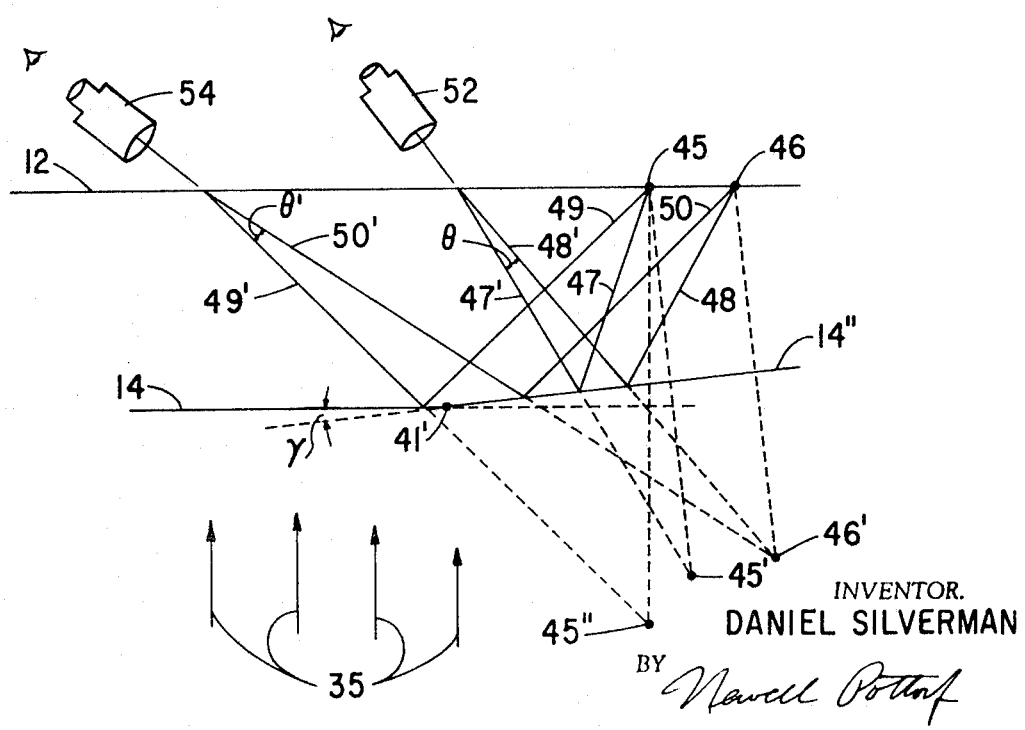
FIG. 4 is a geometrical diagram similar to FIGS. 2 and 3 showing geometrical relationships of an alternative embodiment of the invention.

In FIG. 4 is shown an alternative method by which the shape of a reflecting interface can be determined holographically. Here, the single source 16 is replaced by a plurality of spaced sources, which can be arranged in a two-dimensional pattern. Of this pattern, the two sources 45 and 46 are in the plane of the figure. The reflecting interface is here assumed to be two planes represented by straight lines 14 and 14'' intersecting at a point or hinge 41' with the angle $\gamma$ between them. The interface formed by planes 14 and 14'' is thus concave upwardly as shown. Like FIGS. 2 and 3, this figure has a dual character in that it may be considered as either a diagrammatic representation of the environment in cross section with surface 12, or as a diagram of the hologram 12 in reconstruction illuminated by the monochromatic illumination 35.

If a telescope is placed at position 52 and sighted through the hologram along ray paths 47', 48' to be virtual images 45' and 46' of the sources 45, 46, the apparent angular separation of the source images is the angle $\theta$. If, on the other hand, the observing telescope is placed in position 54, then the ray paths 49, 49' for source 45 will have a reflection point different from that of ray paths 50, 50' from point 46 with the hinge point 41' between them. Thus, sighting from telescope position 54 along paths 49', 50' will show an apparent shift of virtual source 45' to the position 45" so that the apparent angular separation $\theta'$ between the source image positions is quite different from the angular separation $\theta$.

In the general sense, the curvature of a reflecting interface produces distortion or changes in the size or shape of a known pattern of sources, from which distortion or change can readily be deduced the position, nature and amount of the interface curvature. Particularly in the case of a multiple-source pattern which is two-dimensional rather than the linear pattern represented by the two sources 45, 46, it will frequently be of advantage to place a photographic film at the principal focus of the telescope in each of positions 52 and 54, so that visible recordings are preserved of the various distortions of the multiple-source patterns, for subsequent accurate measurement and deduction of precise surface shapes. As with FIGS. 2 and 3, observation or recording of the virtual source patterns at many points over the two-dimensional surface of hologram 12 can provide quite detailed information. It is clear also that the angular position analyses described in connection with FIGS. 2 and 3 can be made for each of the individual sources 45, 46 in the patterns of FIG. 4.

Figure 5:
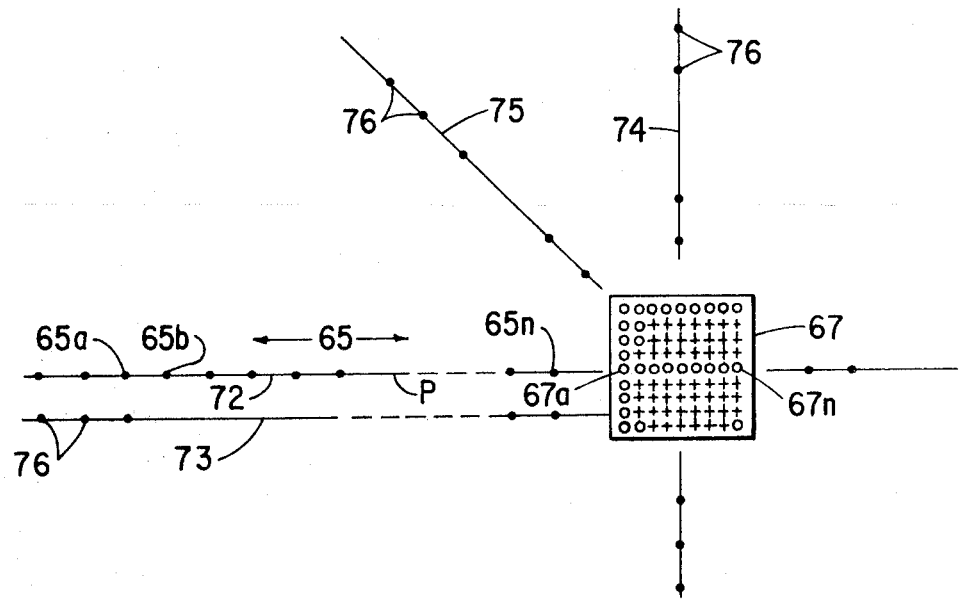
FIGS. 5 and 6 are respectively plan and cross section views similar to FIGS. 2-4 of a further embodiment of the invention utilizing a number of source positions.
Figure 6:
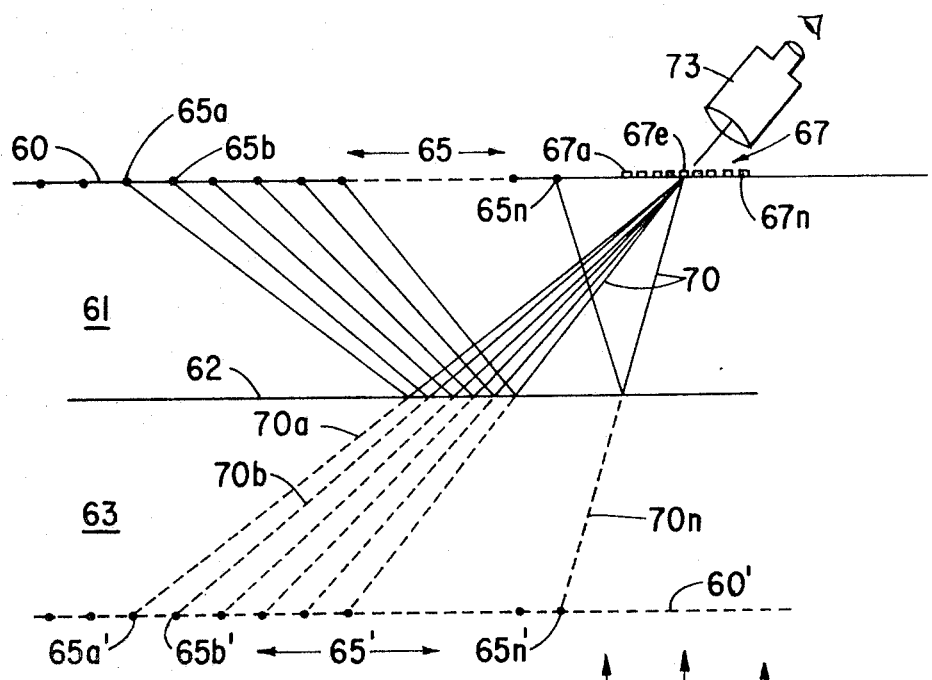

While FIGS. 1 to 4 have thus illustrated the invention as using one or a small number of sources, together with relatively large detector areas from which successive images of the source or sources reflected by a subsurface interface can be reconstructed using different parts of the resulting hologram, these by no means exhaust the useful possible arrangements of sources and detectors. Since what is required is a plurality of spaced reflection ray paths crossing the subsurface interface between a plurality of virtual source positions and a plurality of receiver positions, FIGS. 5 and 6 illustrate an alternative embodiment using essentially a single group of detectors and a correspondingly greater number of sources. FIGS. 5 and 6 show, respectively, plan and cross-sectional elevation views of source and detector layouts relative to the media in the highly diagrammatic form of FIGS. 2-4, which emphasizes the geometrical relationships involved. Underlying a surface 60, are two elastic-wave transmitting media 61 and 63 separated by a reflecting interface 62, the shape of which is to be determined. Laid out on surface 60 is a holographic detector group 67 and a plurality of point sources 65 in suitable one- or two-dimensional array, for example spaced along a radial line 72 extending away from detector group 67. The line 72 represents the intersection of the plane P of FIG. 6 with the plan view of FIG. 5, individual source points being designated 65a, 65b ... 65n, and individual detectors of group 67 designated as 67a, 67b ... 67n. The area and individual detector coverage within group 67 is sufficient for recording a hologram from which the source images can be reconstructed in the manner illustrated in FIGS. 2-4. In making a hologram, a constant frequency vibrator or plurality of such vibrators are operated at source points 65a, 65b ... 65n, either separately and in succession, or simultaneously, a reference wave being added to the waves detected by each individual receiver 67a, 67b ... 67n, to be transduced to a corresponding luminous intensity pattern and recorded as a photographic hologram.

As with FIGS. 2-4, FIG. 6 may also be considered to represent a scale diagram of the resulting hologram viewed in reconstruction when illuminated by monochromatic light designated by the parallel arrows 35. Rays 70 represent directions of arrival of reflected energy at detector group 67, the actual reflection wave travel paths from sources 65a-64n being shown in solid lines, whereas the virtual source positions 65a'-65n' appear in reconstruction through telescope 73 to be located along the virtual surface line 60'. From the apparent directions observed in reconstruction of the individual ray paths 70a, 70b ... 70n, the effect of any other shape than a plane for the interface 62 can be readily deduced by comparison of the configuration of virtual sources 65a'-65n' as compared with real sources 65a-65n, the positions of which are accurately known. To measure the shape or curvature of interface 62 in any other direction, such as in the direction 73 parallel to 72, or in other directions such as 74 or 75, corresponding new source positions 76 would be required.

In summary, therefore, in order to measure the curvature of any reflecting interface along a line formed by a vertical plane passing through the reflecting surface and intersecting the earth's surface, there must be either at least one detection area and a plurality of sources along a line P representing the intersection of the cross section plane with the earth's surface, or there must be correspondingly a number of detection areas and at least one source. Ordinarily, if a sufficiently large number of detectors can be simultaneously laid out and recorded together to form a suitable hologram, it will be more efficient to use the arrangement of FIGS. 5 and 6 employing a single detection area and a correspondingly greater plurality of sources.

While the term "point" has been used in describing sources or source locations, this is not to be interpreted in the strict mathematical sense of zero area but rather in the practical sense that the source area is small compared to the wavelengths and distances involved.

I claim:

1. A wavefront reconstruction method of determining the shape of an elastic-wave reflecting and scattering interface within an elastic-wave transmitting medium comprising the steps of transmitting through said medium to said surface coherent elastic-wave energy from at least one small area source in elastic wave-transmitting contact with said medium, receiving at an areal array of detectors spaced from said source a part of said coherent elastic-wave energy redirected to said array by said surface and including waves reflected to said array from at least two spaced reflection points on said surface, utilizing said received energy and a reference signal in combination to record a hologram corresponding to the coherent wave motions at said detector array, reconstructing from said hologram at least two virtual source images each corresponding to reflection at one of said at least two reflection points, and determining apparent relations between said detector array and said virtual source images, from which relations the attitude of said surface in the vicinity of each of said reflection points can be deduced, said relations-determining step comprising measuring the apparent directions from said detector array to said source-point images.

2. A method as in claim 1 in which said relations-determining step includes the step of measuring the angle between an optical telescope and said hologram when said telescope is aligned with one of said virtual source images.

3. A method as in claim 1 in which said transmitting step comprises transmitting said coherent wave energy from a plurality of space sources arranged in a known pattern and said relations-determining step comprises measuring the apparent angle between two virtual source positions in said pattern.

4. A method as in claim 3, in which said two positions are radially spaced with respect to said detector array.

* * * * *